INVENTOR.
WILLY OLSEN
BY
ATTORNEY.

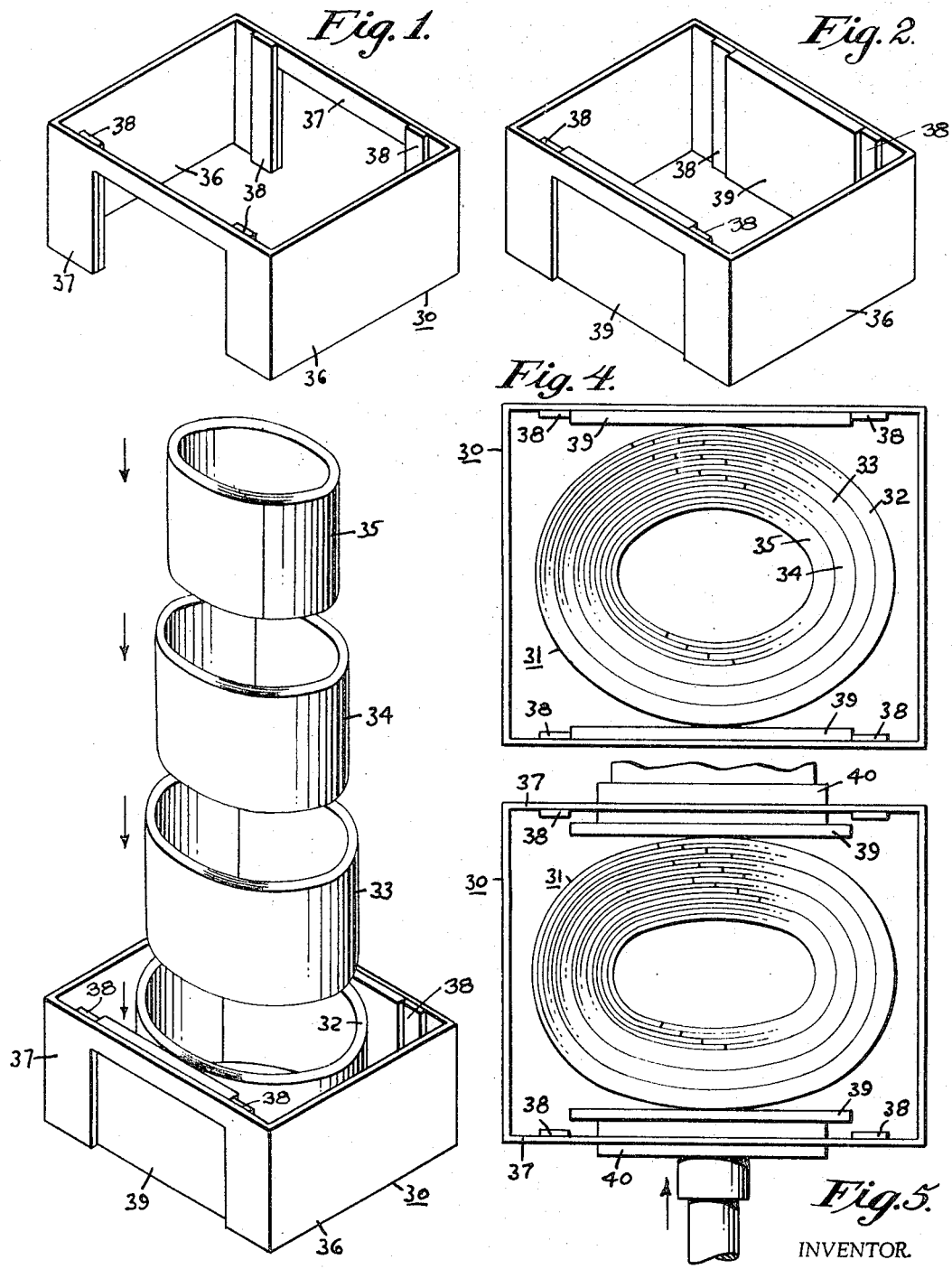

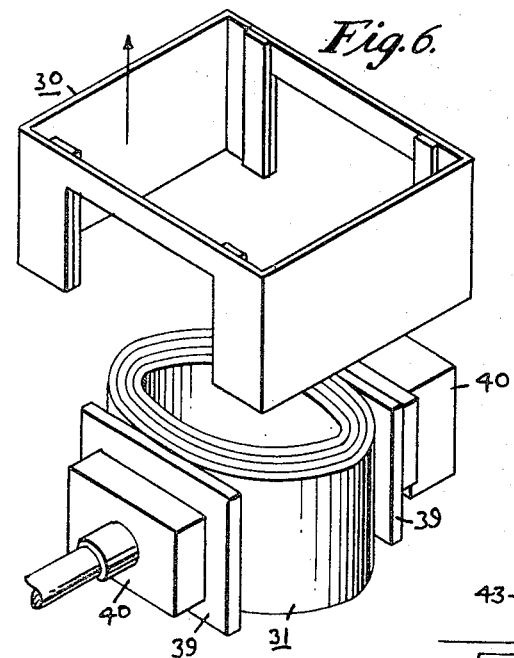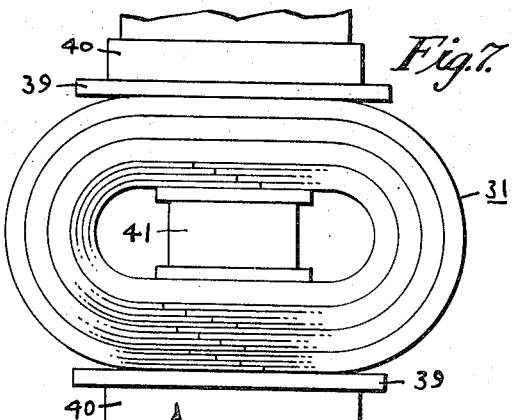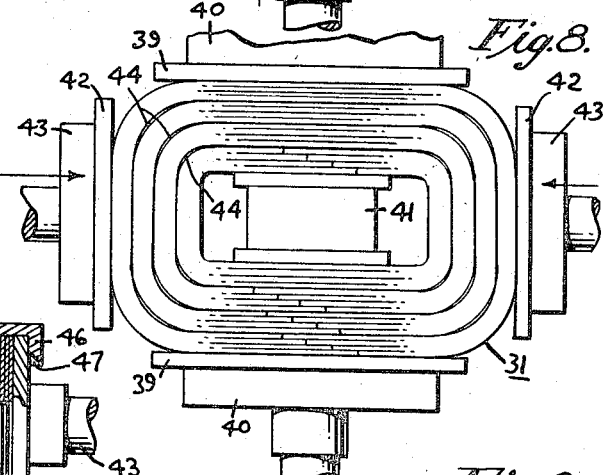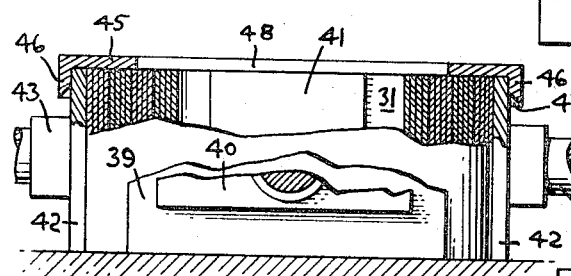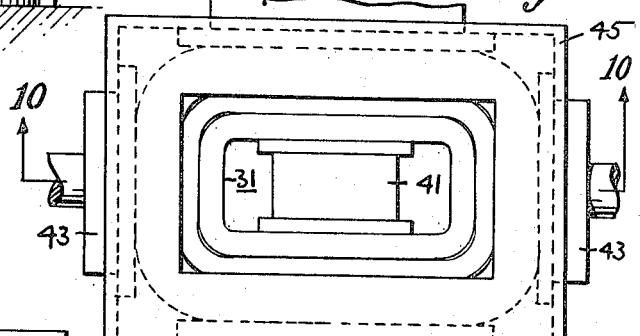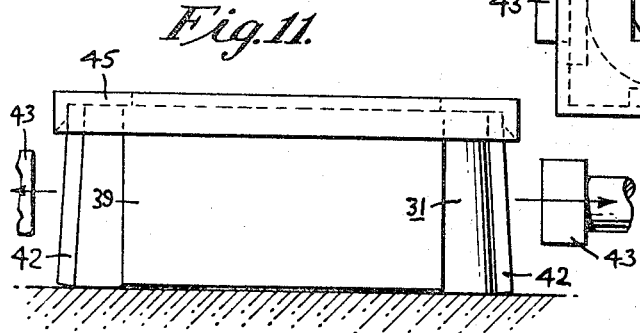

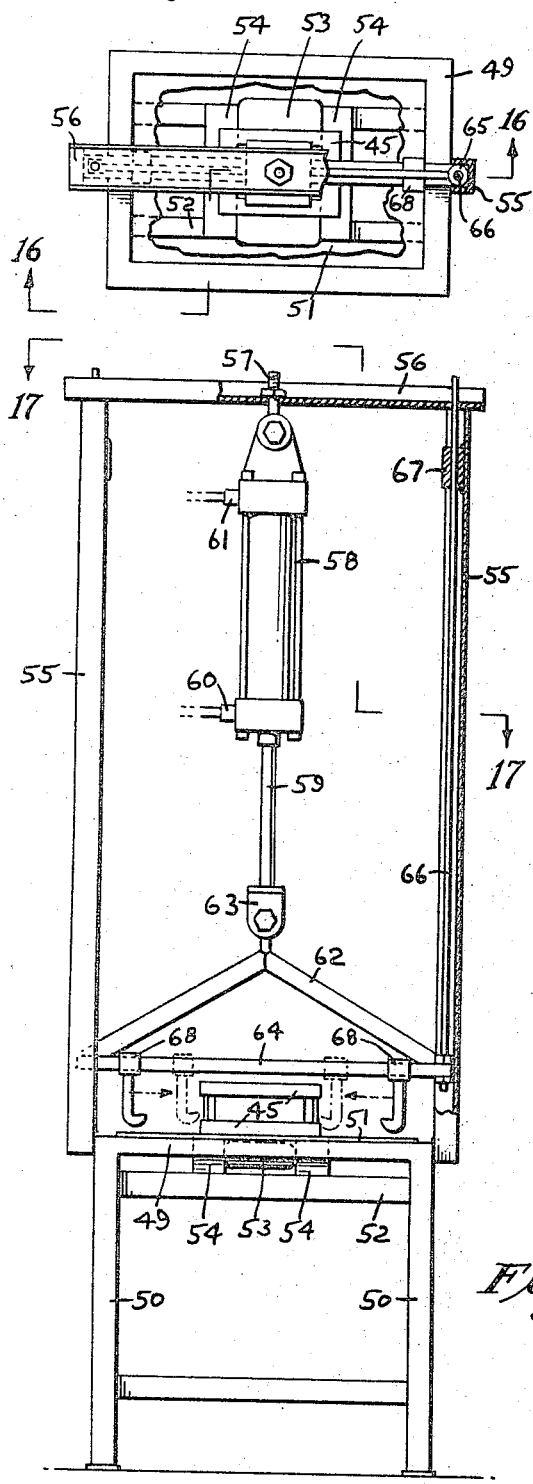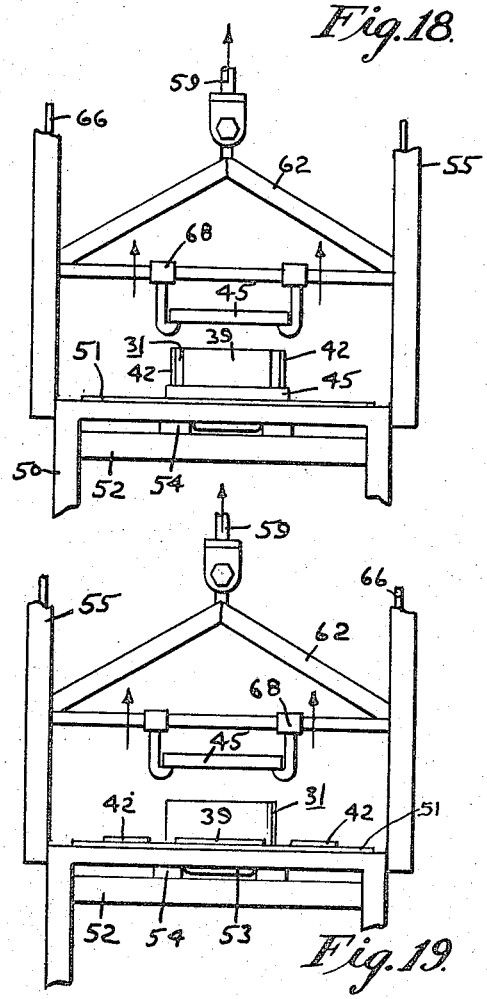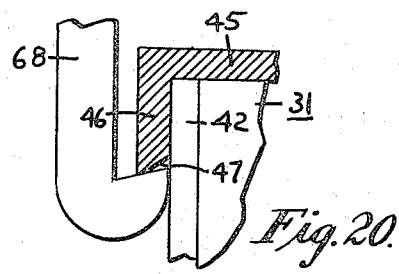

United States Patent Office 3,341,941
Patented Sept. 19, 1967

3,341,941
METHOD OF ASSEMBLING AND FORMING TRANSFORMER CORES WITH THE USE OF AN ASSEMBLY BOX
Willy Olsen, Lynchburg, Va., assignor to H. K. Porter Company, Inc., Lynchburg, Va., a corporation of Delaware
Filed Oct. 24, 1963, Ser. No. 318,726
2 Claims. (Cl. 29—609)

This invention relates generally to apparatus for and a method of assembling wound type transformer cores of the type shown and described in detail in the copending United States patent application of Willy Olsen and Howard D. Tindall, Ser. No. 151,655, filed November 13, 1961, now United States Patent 3,223,955, and entitled "Transformer Core Construction and Method of Producing Same."

Wound transformer cores of this type have superior magnetic characteristics resulting in lower core losses and higher transformer efficiencies. The superiority of wound transformer cores as compared to cores made of solid sections or punched laminations is well known to workers in the art and need not be detailed herein. Moreover, it is also known that a wound transformer core made from a single continuously wound strip of core material will normally exhibit better magnetic properties than a transformer core fabricated from a plurality of strips which have ends butted or lapped to form a composite core. Nevertheless, as a practical matter, manufacturing economics dictate that wound cores should be made from a plurality of strips of core material rather than from a single continuous strip even though the joints inherent in such a construction tend to degrade the magnetic efficiency of the core structure. Therefore, considerable effort has been concentrated upon ways of minimizing the deleterious effects of the joints while maintaining the manufacturing benefits which flow from the jointed type of core construction.

In nearly all instances it is desirable to form a transformer core so that it is of rectangular or square shape having a corresponding rectangular or square central opening or window to accommodate the transformer coil structure in order that the overall transformer may be made as compact as possible, the composite transformer usually including at least two cores each of which is disposed about one leg of the coil structure so that one leg of each core is disposed within the coil window in such manner as to cause the coil window to be substantially completely filled. This type of structure creates problems with regard to the installation of the preformed cores through the coil window since there is very little unoccupied coil window space in the finished assembly and the corners of the core structure must be passed through the window in order to close the core.

The preformed core corners are necessarily deformed by straightening in order to be passed through the window, particularly with regard to the outer laminations of the cores, with the consequent introduction of mechanical stresses and strains into the laminations of the cores. The introduced stresses alter the magnetic properties of the core in an adverse manner and are, of course, undesirable. This condition is aggravated in most wound core constructions by the fact that the core laminations have a high space factor at the corners and are prevented from readily shifting relative to one another as they are stressed while being passed through the coil window. This increases the strains introduced at the corners and further degrades the core performance.

Attempts have been made in the past to reduce the severity of this problem by the use of various forming methods directed toward reducing the space factor at the corners, as for example by the use of insert shims in the corner regions as the core is being wound. Unfortunately, these known methods are either uneconomic or also tend to reduce the space factor in the straight sided legs and yoke regions of the core where a high space factor is desirable. The superior transformer core construction fully described and illustrated in the aforesaid copending United States patent application, and which is also shown in the drawings appended hereto is economically producible by utilization of the apparatus and method according to the present invention to be hereinafter described.

A primary object of this invention is to provide novel apparatus for and a method of making a wound transformer core of rectangular or square form characterized by a high space factor throughout the straight sided regions of the core together with a space factor at the corners of the core sufficiently low to allow for relatively free interlaminar movement during assembly of the core to its coil structure to thereby prevent the creation of mechanical stresses and strains in the core material and preserve the magnetic properties of an unstressed core.

Another object of this invention is to provide a novel apparatus for and method of making a wound transformer core structure which is built up from a plurality of internested core sections wherein the outermost core section functions as a retainer for the additional core sections nested successively therewithin.

A further object of this invention is to provide novel apparatus for fabrication of the wound core structure including an open ended box structure within which the core sections are internested prior to forming into the ultimately desired shape to transport the unformed internested core sections from an assembly point to a forming apparatus, whereby the forming apparatus may be operated continuously.

Yet another object of this invention is to provide a novel apparatus for making wound transformer cores which includes a multiple part annealing box structure which is assembled about the wound core structure during the course of forming the same from the internested unformed core sections.

A further object of this invention is to provide novel apparatus for removing the annealed formed core structure from the aforesaid annealing box without subjecting the annealed core to mechanical strains and stresses which would impair the magnetic properties of the core.

The aforegoing and other objects of the invention will become clear from a reading of the following specification in conjunction with an examination of the appended drawings, wherein:

FIGURE 1 illustrates a perspective view of the open ended assembly box within which the several unformed core sections are to be internested;

FIGURE 2 illustrates the assembly box of FIGURE 1 with a pair of side plates disposed therewithin effective to cover the side openings through the assembly box;

FIGURE 3 is a perspective view illustrating the disposition of the core sections into the assembly box in order beginning with the outermost section and ending with the innermost section;

FIGURE 4 illustrates a top plan view of the assembly box with all of the core sections internested and disposed therewithin;

FIGURES 5 and 6 illustrate the application of pressure to the side plates of the assembly box to move the same inward and permit removal of the assembly box upward and away from the core assembly;

FIGURES 7 and 8 show successive steps in forming the core to the desired rectangular shape;

FIGURES 9 through 15 illustrate the steps of constructing the annealing box about the formed core, FIGURE 10 being a partial vertical section as would be seen when viewed along the line 10—10 of FIGURE 9;

Figure 21:
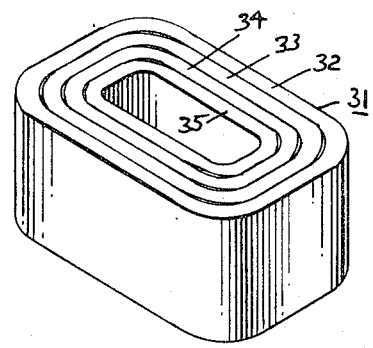

FIGURES 16 through 20 illustrate the apparatus for and steps carried out in removing the annealing box from the annealed formed core, FIGURES 16 and 17 being side and top views respectively of the apparatus as would be seen when viewed along the lines 16—16 and 17—17 of FIGURES 17 and 16; and FIGURE 21 is a perspective of the finished core formed by the apparatus and method of the present invention.

In the several figures, like elements are denoted by like reference characters.

Referring now to the figures, consider first FIGURES 1 to 4 in which there is seen the core assembly box 30 and the unformed core structure 31 made up of a plurality of concentrically internested annular core sections 32 through 35. Each of the core sections 32 through 35 is made up of a plurality of concentrically internested end abutting strips with the end abutments of the strips being successively offset from one another in staircase fashion. The end abutment regions of each of the outer core sections 32, 33 and 34 are observed to be themselves disposed in offset fashion along one side of the core assembly while the end abutments of the innermost core section 35 are observed to be disposed diametrically across the core. This arrangement of the end abutments of the several core sections which together make up the composite core is for the purpose of subsequently providing optimum ease of assembly of the finished structure through the windows of the coil structure with which the cores are to be used in forming a finished transformer, all as set forth in detail in the aforementioned copending patent application.

The core assembly box 30 is of rectangular parallelepiped form with the top and bottom surfaces removed having a pair of opposite end walls 36 and a pair of opposite side walls 37, the side walls 37 being rectangularly substantially centrally apertured upwardly from the bottom edge of the box and stopping short of the top edge so that the side walls 37 appear generally to be of inverted U shape. Secured to the inside face of each of the side walls 37 at opposite side edges of the rectangular apertures through the side walls are vertically extending guides 38 between which are removably disposed side plates 39 which cover the apertures through the side walls 37. As will be subsequently seen, these side plates 39 also form part of the annealing box and function as pressure applying platens which are acted upon by the rams of the forming device.

The core 31 is now built up in the core assembly box 30 between the side plates 39 by first placing the outermost core section 32 downward within the box in a manner best seen in FIGURE 3. The outer lamination of the core section 32 has its abutting ends secured together by means of a piece of tape to prevent the natural resilience of the core strip material from causing this core section to spring open, the outer core section being hand forced into a generally ovoid shape, as seen in FIGURE 4, so that the resilience of the section causes it to expand into firm engagement with the side plates 39 to thereby positionally stabilize the core section within the assembly box. The inner core sections are now successively internested within the outer core section 32 to form the composite unformed core 31 held securely within the core assembly box 30 and ready for forming.

The assembly of an unformed core into a core assembly box, as just described, may be carried out at any convenient location and not necessarily at the forming apparatus. Consequently a number of such unformed cores may be assembled at a convenient location and may be then transported to the forming apparatus so that the cores may be then successively formed one immediately after the other with no loss of time at the forming apparatus as would be the case if it were necessary to assemble each of the unformed core structures at the forming apparatus. In this way, the production efficiencies are realized.

Refer now to FIGURES 5 through 8 in order, the core assembly box 30 containing an unformed core 31 is placed upon the table of the forming apparatus with the open bottom ends of the apertures through the side walls 37 being disposed downward and in alignment with a pair of spaced apart colinearly disposed rams 40 at least one of which is reciprocable relatively to the other. As best seen in FIGURE 5, one of the rams 40 is driven toward the other so as to clamp the side plates 39 between the rams 40, the rams engaging the outer surfaces of the side plates through the openings in the assembly box side walls 37. The ram motion is continued until the side plates 39 are moved toward one another sufficiently to disengage the same from the assembly box 30, the core 31 of course becoming more elongated in the process. The core box 30 is thus disengaged from the side plates 39 and may be lifted vertically upward and completely removed, in the manner seen in FIGURE 6.

With the core 31 in its elongated form as seen in FIGURES 5 and 6, a mandrel 41 of generally rectangular shape is placed within the elongated central opening of the core and the compressive action of the rams 40 is resumed until the inside lamination of the innermost core section is pressed firmly against opposite sides of the mandrel 41 in the manner illustrated in FIGURE 7, it being observed that the joints of the core sections are tightly clamped between the central mandrel 41 and the side plates 39. A pair of opposite end plates 42 are now moved into engagement with opposite ends of the core 31 by means of a pair of end rams 43, the ram pressure being continuously exerted until the ends of the core 31 are squared off in the manner illustrated in FIGURE 8.

As also best seen in FIGURE 8, it is observed that the central opening of the core has also become rectangular and that gaps 44 are observed to intervene the adjacent core sections at the corners of the core. Additionally there also exist slight gaps between the individual laminations of each core section in these same corner regions although these cannot be clearly shown on the drawing. This looseness in the corners reduces the space factor in these regions of the core so that the core sections may be much more readily flexed when installing the same through the window of the preformed coil structure to thereby eliminate the high mechanical stresses which adversely affect the core magnetic characteristics and which are developed in core structures which have high space factors in the corner regions thereof.

As best seen in FIGURES 9, 10 and 11, with the core formed as shown in FIGURE 8 and with the side plates 39 and end plates 42 in position as shown, an annealing box frame 45 of rectangular shape and provided with depending side flanges 46 is fitted downward upon the upper surface of the core 31 so that the side flanges 46 close fittingly enclose the upper outer marginal edges of the side plates 39 and end plates 42. The lower edges of the side flanges 46 are cut upwardly inward as at 47 for reasons which will subsequently appear, and the central part of the frame 45 is cut out as at 48 so that heat from the annealing oven may circulate freely through the inside region of the formed core.

Figure 12:
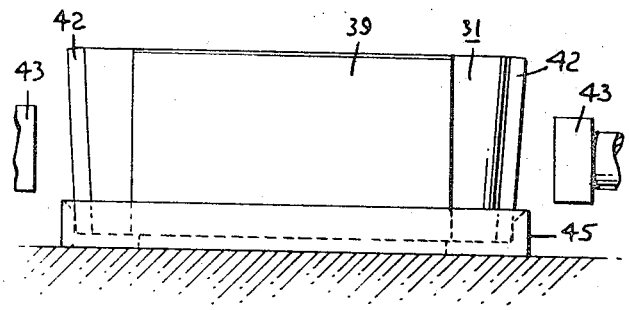
Figure 13:
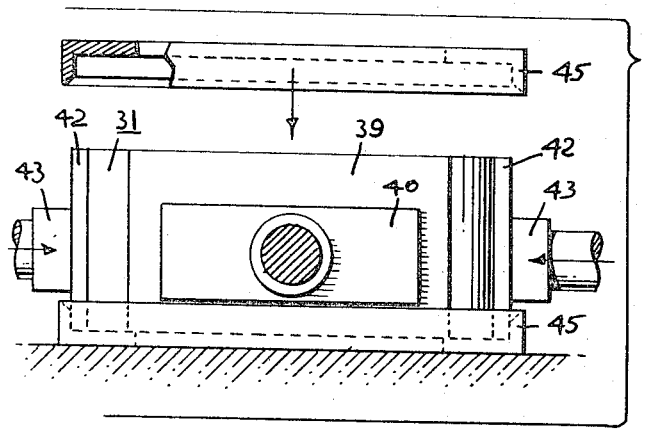
Figure 15:
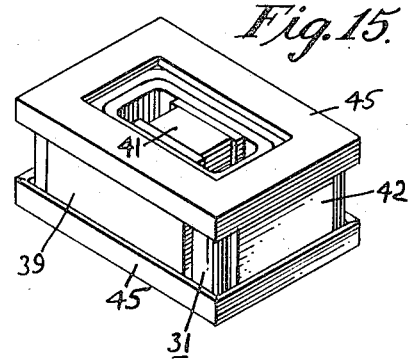
Figure 14:
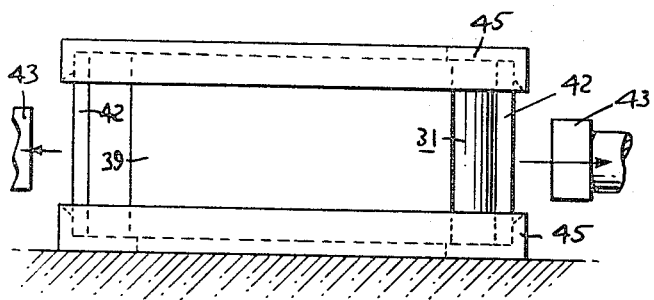

The rams 40 and 43 are now retracted and the core 31 with the enclosing side and end plates and annealing box frame 45 is turned upside down as a unit as shown in FIGURE 12. The rams 40 and 43 are now again moved inwardly into engagement with the side plates 39 and end plates 42 to compress the same so that a second annealing box frame 45 may be moved downward into seating engagement with the core 31 to enclose also the free upper marginal edges of the side plates 39 and end plates 42 as shown in FIGURES 13 and 14. The rams 40 and 43 are again retracted, as in FIGURE 14, and the composite assembly of the formed core within its annealing box may now be removed from the forming apparatus and will appear as shown in FIGURE 15. The boxed formed core may now be annealed, subsequently cooled, and then the core may be removed from the annealing box in the manner to be now described.

Turning now to FIGURES 16 through 20, consider first FIGURES 16 and 17 which illustrate a rectangular table frame 49 supported by legs 50 and supporting a magnetically susceptible top plate 51, as for example made of steel plate. Spaced downwardly from the top 51 and extending transversely therebeneath and secured at opposite ends to the table support structure are a pair of spaced apart horizontal supports 52 which carry thereupon a magnet structure including an energizable field 53 and poles 54, the poles 54 being in surface contact with the underside of top plate 51. Fixedly secured to and extending upward from the frame 49 is a support frame having a pair of vertical members 55 which carry a transversely extending horizontal top member 56, members 55 and 56 being illustrated as of channel shape in cross section.

Suspended vertically from the horizontal top support 56 as by means of a suspension bolt 57 is a cylinder 58 within which is disposed for vertical reciprocation a piston head which is connected to the piston rod 59 observed in FIGURE 16 to extend below the cylinder 58. The piston may be moved upward within the cylinder 58 by injection of hydraulic pressure through the port 60 and venting through the port 61, while the piston may be lowered by the reverse procedure. The piston rod 59 will of course rise or lower in accordance with the motion of the piston head within the cylinder 58 and will carry with it the triangular frame 62 coupled to the lower end of the piston rod 59 as by means of the shackle 63. The triangular frame 62 includes a horizontally extending bar 64 whose opposite ends terminate in vertically oriented cylindrical sleeves 65 disposed within the channel shaped vertical supports 55 and through which vertically extend the guide rods 66 which latter are fixedly secured to the vertical supports 55 as by means of the anchor blocks 67 seen in FIGURE 16. Slidably disposed upon the horizontal bar 64 of the triangular frame 62 are a pair of hooks 68 whose hook like projections are pointed toward one another and inclined upward as most clearly seen in the showing of FIGURE 20.

The annealed formed core 31 enclosed within the annealing box in the manner shown in FIGURE 15 is placed upon the top plate 51 above the magnet structure so that one of the annealing box frames 45 is disposed flatwise upon the top plate in generally overlying relation to the magnet structure, the annealing box being so positioned that the hooks 68 may be moved inward toward it along the horizontal bar 64 of the triangular frame 62 to permit the upwardly turned hook ends to underlie the inwardly upwardly cut lower edges 47 of the side flanges 46 of the upper annealing box frame 45.

The magnet structure is now energized to strongly magnetically hold the annealing box and core contained therewithin downward upon the top plate 51. Next, the slidable hooks 68 are moved inward to underlie the opposite ends of the frame side flanges as shown by the dotted line showing in FIGURE 16. The piston within the cylinder 58 is now subjected to upward lifting force by hydraulic or pneumatic pressure applied through the cylinder port 60, thus causing the piston rod 59 to raise and carry with it the triangular frame 62 and slidable hooks 68. The hooks 68 anchor under the annealing box frame side flanges 46, as shown in the detail of FIGURE 20, and continued upward movement of the frame 62 results in the upward removal of the annealing box upper cover 45 as illustrated in FIGURE 18. The magnet structure is now deenergized and removed frame 45 is lifted from the hooks 68 and set aside, after which the hooks 68 are slid outward away from one another and the frame 62 is again lowered by releasing the pressure on the piston within the cylinder 58.

With the magnet deenergized the partially housed core structure may now be turned top for bottom so that what was formerly the bottom frame of the annealing box now becomes the top frame. The magnet structure is now again reenergized and the hooks 68 are slid inward to underlie the side flanges 46 of the remaining annealing box frame 45, after which actuation of the piston removes this remaining frame 45. Deenergization of the magnet now releases the side plates 39 and end plates 42 of the annealing box structure from the finished core 31, this being illustrated in the showing of FIGURE 19. The mandrel 41 may now be lifted out of the core window to leave the completed annealed formed core 31 which appears as shown in FIGURE 21.

Having now described my invention in connection with particularly illustrated embodiments thereof it will be appreciated that modifications and variations of the same may now occur from time to time to those persons normally skilled in the art without departing from the essential scope or spirit of my invention, and accordingly it is intended to claim the same broadly as well as specifically as indicated by the appended claims.

What is claimed as new and useful is:

1. The method of forming a substantially rectangular transformer core having a substantially rectangular window from a plurality of internestable circular wound transformer core sections each having a circular central window and being built up of layers of magnetic core strip material, comprising the steps of, at an assembly station laterally compressing the core section of largest diameter from diametrically opposite sides so that it becomes ovoid in shape and then placing the compressed core section with its shorter lateral dimension between a pair of rigid forming plates which are maintained by spacing means in parallel spaced relation to one another at a separation equal to the aforesaid shorter lateral dimension of said core section said forming plates having free upper and lower edges, internesting within the largest diameter core section the core sections of successively smaller diameter by also laterally compressing each such section in turn and slipping it into the section of next larger size until the complete unformed core is built up between the said pair of rigid forming plates, transferring the unformed core assembly to a forming station, subjecting the said forming plates to a pair of colinear forces directed toward one another to render the core more ovoid in shape and releasing said plates from said spacing means; removing said spacing means from the vicinity of said core and released plates and placing a forming mandrel having at least one pair of spaced apart parallel sides within the window of the core so that the parallel sides of the mandrel are disposed parallel to and between the said pair of rigid parallel forming plates, moving said pair of forming plates toward one another to form the ovoid core into a flattened oval with the core material clamped tightly between the parallel sides of the mandrel and the parallel forming plates, exerting a pair of colinear oppositely directed inward forces upon the curved ends of the flattened oval core along a line perpendicular to the line of action of the aforesaid pair of forces by means of another pair of rigid parallel forming plates having planar surfaces perpendicular to the parallel sides of the mandrel to thereby form the flattened oval core into a rectangular core, securing the free upper edges of the forming plates in position by placing a rigid frame downward thereover, withdrawing the colinear forces and turning the core and forming plate assembly top-for-bottom so that the free lower edges become the upper edges and reapplying the colinear forces, securing the free upper edges of the forming plates by placing a rigid frame downward thereover and then withdrawing the colinear forces.

2. The method of forming a transformer core from a plurality of internestable, circular wound transformer core sections each having a central window and being built up of layers of magnetic core strip material, comprising the steps of, laterally compressing the core section of largest diameter to form it to a first shape so that it may be placed between a plurality of rigid forming plates which are maintained in a desired spaced and oriented relationship to one another and which will hold the core section in the first shape when the core section is so placed therebetween said forming plates having free upper and lower edges, placing the said shaped core section between a plurality of rigid forming plates maintained in the aforesaid desired spaced and oriented relationship to one another by spacing means, internesting within the largest diameter core section the core sections of successively smaller diameter by also laterally compressing each such section in turn and slipping it into the section of next larger size until the complete core is built up, subjecting the forming plates to forces which move the plates toward one another until the central window of the core is of proper shape to receive a forming mandrel and at the same time releasing said forming plates from said spacing means, removing said spacing means from the vicinity of said core and said forming plates, placing a forming mandrel within the core window and moving the forming plates toward one another to clamp the core material between the mandrel and forming plates and thereby bring the core to its desired shape, securing the free upper edges of the forming plates in position by placing a rigid frame downward thereover; withdrawing the forces exerted against the forming plates and turning the core and forming plate assembly top-for-bottom so that the free lower edges become the upper edges and reapplying the forces, securing the free upper edges of the forming plates by placing a rigid frame downward thereover and then again withdrawing the forces.

References Cited

UNITED STATES PATENTS

| | | | |
|---|---|---|---|
| 350,344 | 10/1886 | Caldwell | 206—59 |
| 754,056 | 3/1904 | Easton | 249—164 |
| 2,055,175 | 9/1936 | Frantz | 29—155.61 |
| 2,416,989 | 3/1947 | Gauther | 29—155.57 |
| 2,614,158 | 10/1952 | Sefton et al. | 29—155.57 X |
| 3,223,955 | 12/1965 | Olsen et al. | 29—155.57 X |

JOHN F. CAMPBELL, *Primary Examiner.*

R. W. CHURCH, *Assistant Examiner.*